US010585441B2

United States Patent
Qin et al.

(10) Patent No.: US 10,585,441 B2
(45) Date of Patent: Mar. 10, 2020

(54) UNMANNED AERIAL VEHICLE SYSTEM AND METHOD WITH ENVIRONMENTAL SENSING

(71) Applicant: Hangzhou Zero Zero Technology Co., Ltd., HangZhou, Zhejiang (CN)

(72) Inventors: Yusen Qin, Zhejiang (CN); Tong Zhang, Zhejiang (CN); Mengqiu Wang, Zhejiang (CN)

(73) Assignee: Hangzhou Zero Zero Technology Co., Ltd., HangZhou (CN)

( * ) Notice: Subject to any disclaimer, the term of this patent is extended or adjusted under 35 U.S.C. 154(b) by 0 days.

(21) Appl. No.: 16/169,284

(22) Filed: Oct. 24, 2018

(65) Prior Publication Data
US 2019/0107844 A1   Apr. 11, 2019

Related U.S. Application Data

(63) Continuation of application No. 15/701,740, filed on Sep. 12, 2017, now Pat. No. 10,139,837.
(Continued)

(51) Int. Cl.
*G05D 1/10* (2006.01)
*H04N 5/225* (2006.01)
(Continued)

(52) U.S. Cl.
CPC .......... *G05D 1/102* (2013.01); *B64C 39/024* (2013.01); *B64D 45/04* (2013.01); *B64D 47/02* (2013.01);
(Continued)

(58) Field of Classification Search
CPC .... G05D 1/102; G05D 1/0094; B64C 39/024; B64D 47/08; H04N 5/2256; H04N 7/185
(Continued)

(56) References Cited

U.S. PATENT DOCUMENTS 9,661,327 B2 *  5/2017  Nilsson .................. H04N 9/646
9,849,981 B1 * 12/2017  Burgess .................. B64D 1/12
(Continued)

FOREIGN PATENT DOCUMENTS

CN   101866180 A   10/2010
CN   102156480 A    8/2011
(Continued)

OTHER PUBLICATIONS

International Preliminary Report on Patentability (International Application No. PCT/IB2017/055509; dated Mar. 28, 2019; 6 pages.
(Continued)

*Primary Examiner* — Muhammad Shafi
(74) *Attorney, Agent, or Firm* — Howard & Howard Attorneys PLLC

(57) ABSTRACT

An aerial system and method of operating an aerial system is provided. The aerial system includes a body, a lift mechanism, a processing system, a camera, and a sensor module. The lift mechanism is coupled to the body and configured to controllably provide lift and/or thrust. The processing system is configured to control the lift mechanism to provide flight to the aerial system. The camera is coupled to the body and is configured to obtain images of an environment proximate the aerial system. The sensor module is coupled to the body and includes an emitter and a receiver. The receiver is configured to sense data related to an ambient environment associated with the aerial system. The processing system controls a controllable parameter of the lift mechanism or the emitter as a function of the sensed data.

26 Claims, 10 Drawing Sheets

Related U.S. Application Data

(60) Provisional application No. 62/393,771, filed on Sep. 13, 2016.

(51) Int. Cl.
| | | |
|---|---|---|
| *G01S 17/89* | (2020.01) | |
| *B64D 45/04* | (2006.01) | |
| *B64D 47/02* | (2006.01) | |
| *G05D 1/00* | (2006.01) | |
| *B64C 39/02* | (2006.01) | |
| *B64D 47/08* | (2006.01) | |
| *H04N 7/18* | (2006.01) | |
| *G01S 15/93* | (2020.01) | |
| *G01S 17/02* | (2020.01) | |
| *G01S 17/933* | (2020.01) | |
| *G01S 15/02* | (2006.01) | |
| *G01S 13/86* | (2006.01) | |
| *G01S 13/88* | (2006.01) | |
| *G01S 13/93* | (2020.01) | |
| *G01S 13/94* | (2006.01) | |
| *G01S 13/08* | (2006.01) | |
| *G01S 15/08* | (2006.01) | |
| *G01S 17/08* | (2006.01) | |

(52) U.S. Cl.
CPC .............. *B64D 47/08* (2013.01); *G01S 17/89* (2013.01); *G05D 1/0038* (2013.01); *G05D 1/0094* (2013.01); *H04N 5/2252* (2013.01); *H04N 5/2256* (2013.01); *H04N 7/185* (2013.01); *B64C 2201/027* (2013.01); *B64C 2201/108* (2013.01); *B64C 2201/123* (2013.01); *B64C 2201/127* (2013.01); *B64C 2201/141* (2013.01); *G01S 13/08* (2013.01); *G01S 13/867* (2013.01); *G01S 13/882* (2013.01); *G01S 13/93* (2013.01); *G01S 13/94* (2013.01); *G01S 15/025* (2013.01); *G01S 15/08* (2013.01); *G01S 15/93* (2013.01); *G01S 17/023* (2013.01); *G01S 17/08* (2013.01); *G01S 17/933* (2013.01); *Y02T 50/53* (2013.01)

(58) Field of Classification Search
USPC .......................................................... 701/4
See application file for complete search history.

(56) References Cited

U.S. PATENT DOCUMENTS

| | | | | |
|---|---|---|---|---|
| 2011/0035149 | A1* | 2/2011 | McAndrew | G05D 1/0038 |
| | | | | 701/466 |
| 2012/0293371 | A1* | 11/2012 | Lu | G01S 1/04 |
| | | | | 342/387 |
| 2014/0240498 | A1 | 8/2014 | Ohtomo et al. | |
| 2014/0293746 | A1* | 10/2014 | Tran | G01F 23/00 |
| | | | | 367/93 |

FOREIGN PATENT DOCUMENTS

| | | |
|---|---|---|
| CN | 102981509 A | 3/2013 |
| CN | 104656669 A | 5/2015 |
| CN | 205049143 U | 2/2016 |

OTHER PUBLICATIONS

International Search Report and Written Opinion (International Application No. PCT/IB2017/055509; dated Jan. 15, 2018; 12 pages.

* cited by examiner

UNMANNED AERIAL VEHICLE SYSTEM AND METHOD WITH ENVIRONMENTAL SENSING

CROSS-REFERENCE TO RELATED APPLICATION

This application is a continuation of U.S. patent application Ser. No. 15/701,740, filed Sep. 12, 2017, which claims the benefit of U.S. Provisional Patent Application Ser. No. 62/393,771, filed Sep. 13, 2016, the disclosures of which are hereby incorporated by referenced in their entirety.

TECHNICAL FIELD

This invention relates generally to the aerial vehicle field, and more specifically to a new and useful system and method for environmental sensing in the aerial vehicle field.

BACKGROUND OF THE INVENTION

Unmanned aerial vehicles (UAVs, or drones) are oftentimes used to record data about the ambient environment. For example, drones can be used to record images or video of the ambient environment during flight. These conventional UAVs (e.g., consumer drones) are typically remotely operated by a user using vision-based methods, wherein the user either uses line of sight to the drone to control flight and/or avoid obstacles, or uses the video feed from the drone to control flight and/or avoid obstacles. However, both ambient environment data capture and vision-based remote user drone control can become problematic in low-light conditions.

SUMMARY OF THE INVENTION

In one aspect of the present invention, an aerial system is provided. The aerial system includes a body, a lift mechanism, a processing system, a camera, and a sensor module. The lift mechanism is coupled to the body and configured to controllably provide lift and/or thrust. The processing system is configured to control the lift mechanism to provide flight to the aerial system. The camera is coupled to the body and is configured to obtain images of an environment proximate the aerial system. The sensor module is coupled to the body and includes an emitter and a receiver. The receiver is configured to sense data related to an ambient environment associated with the aerial system. The processing system controls a controllable parameter of the lift mechanism or the emitter as a function of the sensed data.

In another aspect of the present invention, a method for operating an aerial system is provided. The aerial system includes a body, a lift mechanism, a processing system, a camera, and a sensor module. The lift mechanism is coupled to the body and is configured to controllably provide lift and/or thrust. The processing system is configured to control the lift mechanism to provide flight to the aerial system. The camera is coupled to the body and configured to obtain images of an environment proximate the aerial system. The sensor module is coupled to the body and includes an emitter and a receiver. The receiver is configured to sense data related to an ambient environment associated with the aerial system. The method includes the steps of: sensing, by the sensor module, data related to an ambient environment associated with the aerial system; and, controlling, by the processing system, a controllable parameter of the lift mechanism or the emitter as a function of the sensed data.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
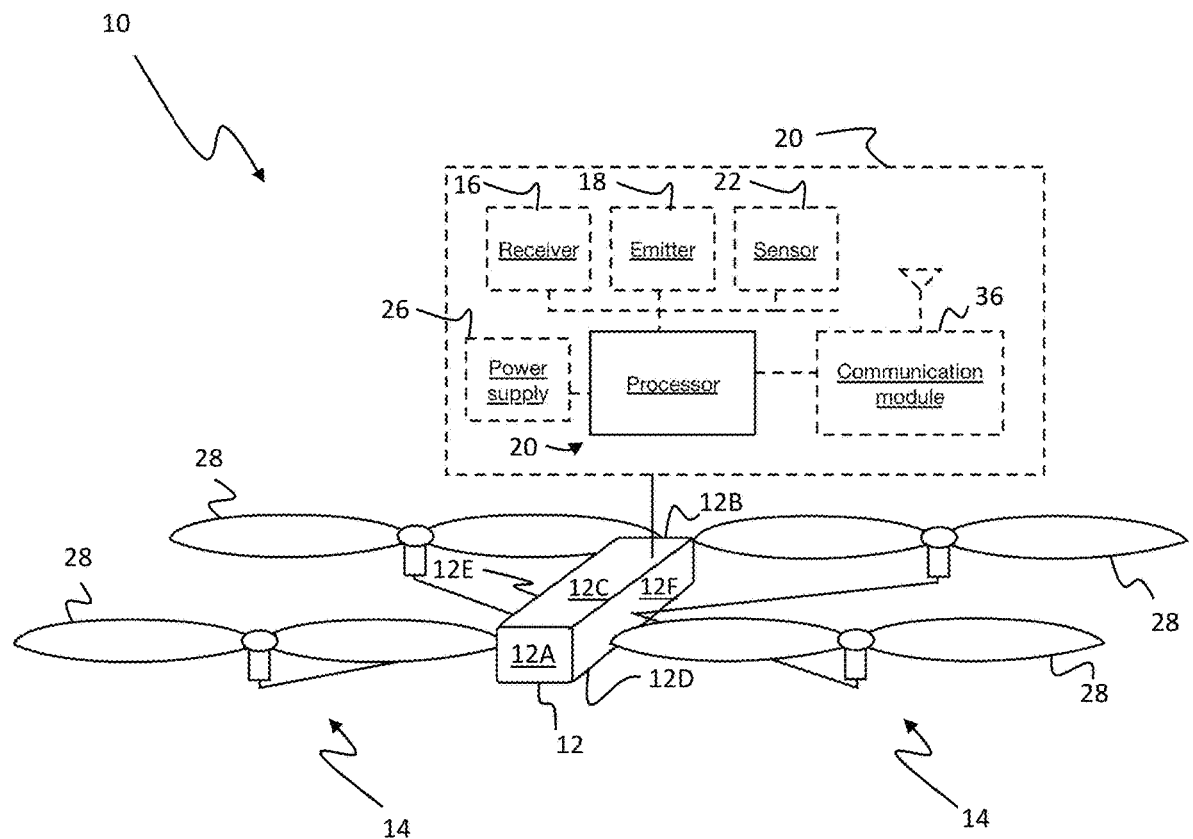
FIG. 1 is a schematic representation of the aerial system.

As shown in FIG. 1, in one embodiment the aerial system 10 (UAV system) includes a housing or body 12, a lift mechanism 14, a receiver 16, an emitter, and a processing system 20 including processor. The aerial system 10 may optionally include a set of auxiliary sensors 22, a communication module 24, and a power supply 26. The aerial system 10 functions to automatically adjust emitter signal emission.

In a specific variation as shown in FIG. 2, the aerial system 10 includes a housing 12 with a front 12A, back 12B, top 12C, bottom 12D, and left and right sides 12E, 12F; a set of rotors 28 mounted to the left and right sides; a camera 30 mounted to the housing front, a light-emitting sub-assembly 32 mounted to the front 12A of the housing 12 adjacent the camera 30; a set of flight sensors 34 (e.g., IMU, etc.); the processing system 20 configured to control flight of the aerial system 10 based on flight sensor measurements (e.g., based on remote control instructions and/or automatically-generated instructions), operation of the light-emitting sub-assembly 32, and operation of the camera 30; and a rechargeable battery, acting as the power supply 36, electrically connected to and configured to power the rotors 28, camera 30, light emitting sub-assembly 32, flight sensors 34, and processing system 20. The UAV system 12 may optionally include a second, downward-facing camera 30 and second light-emitting sub-assembly 32 mounted on the bottom 12D of the housing 12. Each light-emitting sub-assembly 32 may include one more emitters 18, e.g., light emitting diodes or LEDs.

In one aspect of the present invention, an aerial system 10 includes a body 12, a lift mechanism 14, a processing system 20, a camera 30, and a sensor module 16, 18. The lift mechanism 14 is coupled to the body 12 and configured to controllably provide lift and/or thrust. The processing system 20 is configured to control the lift mechanism 14 to provide flight to the aerial system 10. The camera 30 is coupled to the body 12 and configured to obtain images of an environment proximate the aerial system 10. The sensor module 16, 18 is coupled to the body 12 and includes an emitter 18 and a receiver 16. The receiver 16 is configured to sense data related to an ambient environment associated with the aerial system 10. The processing system 20 is further configured to control a controllable parameter of the lift mechanism 14 or the emitter 18 as a function of the sensed data.

In one embodiment, the processing system 20 is configured to detect a high-noise and/or a low-light ambient condition as a function of the sensed date and to actuate the emitter 18 in response to detecting the high-noise and/or low-light ambient condition. The emitter 18 may be configured to provide a visual reference to a user or to illuminate a target object and/or a region associated with the camera 30. The amount of actuation of the emitter 18 may be determined as a function of ambient light detected by the receiver 16, the camera 30 or other sensor.

In another embodiment, the processing system 20 may be configured to control the emitter 18 as a function of an operation context of the aerial system 10. For example, the operation context of the aerial system 10 may be an operation mode, e.g., a stealth mode, a hover mode, or a fly straight mode.

The aerial system 10 may include at least one flight sensor 34 (see below) for detecting one or more parameters associated with the operation of the aerial system 10. The processing system 20 may be further configured to adjust operation of the emitter 18 operation as a function of the sensed data from the receiver 16 and/or the at least one flight sensor 34.

The processing system 20 may be configured send the sensed date to an off-board system (not shown) for analysis. As discussed in further depth below, the processing system 20 may be configured to establish an ambient environment topography as a function of the sensed data and/or to establish a distance between the aerial system 10 and a target object as a function of the sensed data.

In another aspect of the present invention, the processing system 20 may generate flight instructions, at least in part, as a function of the sensed data and may control the lift mechanism 14 as a function of the flight instructions. In still another aspect, the flight instructions override any remote-control instructions.

The processing system 20 may be configured to identify any objects in a current flight path as a function of the sensed data and to generate the flight instructions to avoid any identified objects.

Each sensor module 16, 18 may include a first set of emitters and a second of emitters. Each set of emitters includes at least one emitter 18. The processing system 20 may be further configured to switch between the first and second set of emitters as a function of the sensed data. For example, the first set of emitters may be associated with normal light conditions and the second set of emitters may be associated with low-light conditions.

The processing system 20 may be configured to establish a signal quality as a function of the sensed data and adjust operation of the emitter 18 to obtain a better signal.

In one specific embodiment, the camera 30 may be downward facing and configured to capture images an automated landing procedure. The processing system 20 may be configured to determine a distance between aerial system 10 and a landing surface as a function of the sensed data. The processing system 20 may be configured to control the emitter 18 as a function of the distance and to generate landing instructions based on the distance and images(s) capture by the camera 30. The processing system 20 may be further configured to control the lift mechanism 14 as a function of the landing instructions.

2. Benefits

The aerial system 10 may confer several benefits over conventional systems.

First, the emitter(s) 18 may expand the applications in which an aerial system 10 may be used. For example, the emitter 18 may enable ambient data recordation in high-noise and/or low-signal applications by augmenting the ambient signals. For example, the emitter sub-assemblies 32 may act as an on-board lighting system that may selectively illuminate a target object or region in the ambient environment for image recordation. In a second example, the emitter sub-assemblies 32 may facilitate better remote user control of the aerial system 10 in low-light conditions, for example, the emitted signal may function as a visual reference for the user). In a specific example, the aerial system 10 may selectively operate downward and/or forward facing light(s) to (visually) indicate the position, attitude, orientation and/or other parameter of the aerial system 10 to a user remotely controlling the aerial system 10.

Second, the aerial system 10 may decrease (or eliminate) user cognitive load resulting from controlling an additional component (the emitter 18) by automating control of the emitter sub-assembly or sub-assemblies 32. In a first example, the aerial system 10 may be configured to automatically adjust operation of the emitter sub-assembly or sub-assemblies 32, based on context, for example, flight mode. In a specific example, the aerial system 10 may include infrared emitter(s) 18 and visible light emitter(s) 18. The aerial system 10 may be configured to automatically control the emitter sub-assembly or sub-assemblies 32 to operate in a first mode, e.g., turn on the IR emitters 18 and turn/keep the visible range emitters 18 off, in response to determination that the aerial system 10 is operating in a stealth mode, and control the emitter sub-assembly or sub-assemblies 32 to operate in a second mode, e.g., turn/keep off the IR emitters 18 and turn/keep the visible range emitters 18 on, in response to determination that the aerial system 10 is operating in a video-recording mode.

In a second example, the aerial system 10 may be configured to automatically adjust operation of the emitter sub-assembly or sub-assemblies 32 based on ambient environment signals. In a specific example, the aerial system 10 may be configured to automatically adjust the emitter sub-assembly or sub-assemblies 32 to emit light based on the ambient light (determined from an ambient light sensor or the camera 30, to reach a target light intensity, or automatically adjust the emitted light based on how well a target object is being illuminated, e.g., determined from the feed from the camera 30).

Third, the aerial system 10 may be configured to enable and/or increase the reliability of autopilot applications, such as automated flight, landing, and remote control override, by automatically adjusting the light emitted by the emitter sub-assembly or sub-assemblies 32. For example, the aerial system 10 may be configured to selectively scan or illuminate a landing zone; to automatically determine the landing zone distance, topography, or other landing zone parameter values; to automatically generate landing instructions based on the landing zone parameter values; and to control the aerial system 10 to land in the landing zone. In a specific example, the aerial system 10 may be configured to additionally automatically control the emitter sub-assembly or sub-assemblies 32 to adjust light parameters (e.g., light intensity, saturation, polarization, etc.) based on the distance between the aerial system 10 and the landing zone, such that the landing zone is always illuminated with incident light having a predetermined set of parameters, independent of the distance between the landing zone and the aerial system 10 (and therefore, light emitter distance) away from the landing zone. In a second example, the aerial system 10 may be configured to automatically identify an obstacle in its flight path using the emitter 18 and the receiver 16, and automatically override instructions to fly according to the flight path (e.g., using automatically-generated flight instructions, such as instructions to avoid the obstacle or switch to hovering).

Fourth, the aerial system 10 may be optimally configured to support relatively high-power-consuming emitters 18. For example, the aerial system 10 may be configured to automatically adjust operation of the emitter sub-assembly or sub-assemblies 32 to optimize aerial system 10 performance. In a specific example, the aerial system 10 may decrease a predetermined target lighting parameter value in response to the state of charge, i.e., charge level, of the power supply 26 falling below a predetermined threshold, or in response to determination of imminent high power draw operation. In a second example, the aerial system 10 may decrease weight by removing an emitter cooling system, and instead redirect rotor wash to cool the emitter 18 and/or other components. This may be particularly desirable when the emitter 18 is a high-power emitter 18 and/or is operated in a high-power mode (e.g., controlled to emit 100 lumens, 200 lumens, 300 lumens, etc.), as high-power operation may generate waste heat that may degrade or otherwise affect aerial system component operation. In a third example, the aerial system 10 may decrease bulk and weight, and decrease mounting instability, by integrating the emitter 18 into the aerial system 10 itself. In a fourth example, the emitter 18 may be arranged in the aerial system 10 such that the aerial system 10 has a substantially uniform front-to-back weight distribution.

However, the UAV system may confer any other suitable set of benefits.

3. System.

The housing 12 of the aerial system 10 functions to support and/or protect the aerial system 10 components. In one embodiment, the housing 12 substantially encapsulates a communication module 24 or system 36, the power source 26, and processing system 20, but may be otherwise configured. The housing 12 may include a platform, an enclosure, or have any other suitable configuration. In one embodiment, the housing 12 is thermally conductive, i.e., functions as an auxiliary heat sink. The housing 12 may be made of carbon fiber, carbon composite, metal, plastic, ceramic, or any other suitable material. The housing 12 may have a prismatic geometry, cylindrical geometry, spherical geometry, or have any other suitable geometry.

The housing 12 may optionally define a set of openings that function to selectively or openly permit fluid flow, signal flow (e.g., electromagnetic radiation flow, such as light, radio waves, etc.; sound flow; etc.), or any other suitable signal flow between the housing interior and housing exterior.

The housing 12 may optionally define a set of mounting points that function to mount the lift mechanism 14. The mounting points may be defined along the housing exterior (e.g., housing sides), be defined by frames extending from the exterior of the housing 12 (e.g., from the sides 12E, 12F), or be otherwise defined. The frames may be statically coupled to the exterior of the housing 12, be actuatably coupled to the exterior of the housing 12, or be otherwise coupled to the exterior of the housing 12. In one variation, the frames rotate relative to the housing 12 about a rotation axis substantially parallel the frame longitudinal axis. However, the housing 12 may include any other suitable component.

The lift mechanism 14 of the aerial system 10 functions to provide lift and/or thrust for the aerial system 10. The lift mechanism 14 may be configured to additionally function to cool the aerial system components (e.g., processing system 20, communications system 36, etc.), the interior of the housing 12, or perform any other suitable functionality. The aerial system 10 may include one or more lift mechanisms 14 acting in concert or independently. The lift mechanism 14 may be mounted to the housing 12 at the mounting point or otherwise coupled to the housing 12.

Figures 2A, 2B:
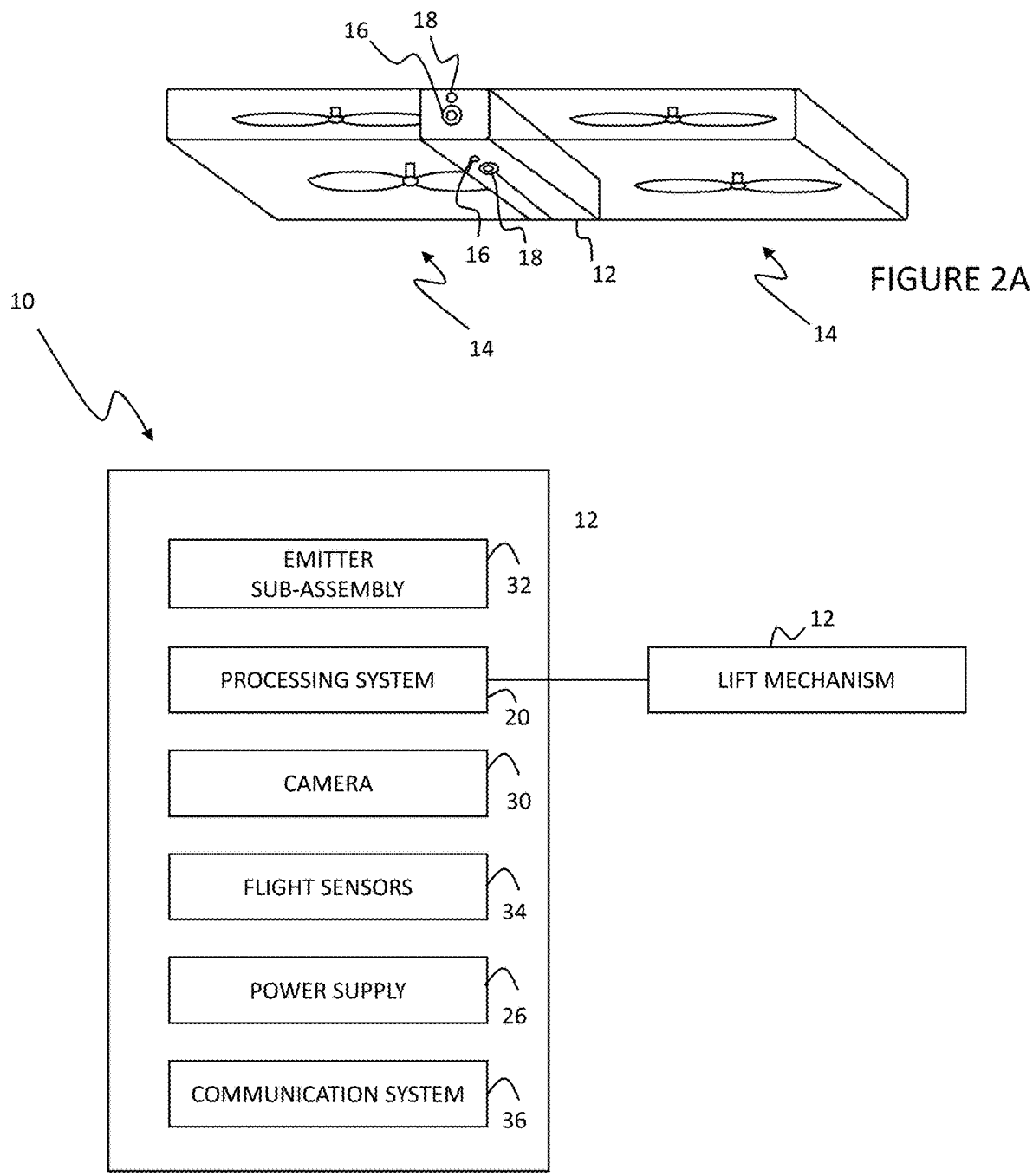
FIG. 2A is a schematic representation of an example of the aerial system, including a front sensor module and a bottom sensor module.
FIG. 2B is a block diagram of an exemplary aerial symbol, according to an embodiment of the present invention.

In one embodiment, as shown in FIGS. 1 and 2A, the lift mechanism 14 may include a set of rotor blades 28, each driven by one or more motors (not shown), but may alternatively include a set of jet engines, propellers, or any other suitable force-generation mechanism.

The rotor blades 28 of the lift mechanism 14 function to move a mass of air to generate thrust and/or to cool the heat-generating component. The rotor blades 28 are preferably airfoils, but may have any other suitable construction. The rotor blades 28 may be rotatably attached to the mounting point (e.g., along the rotational axis) or otherwise mounted to the housing 12. The lift mechanism 14 preferably includes four rotor blades 28, but may alternatively include 6 rotor blades 28, 8 rotor blades 28, 12 rotor blades 28, or any suitable number of rotor blades.

The motor of the lift mechanism 14 functions to drive rotor motion. Each rotor set preferably includes a single motor, but may alternatively include more or less. The motors are preferably controlled by the processing system 20, which also controls the emitter sub-assembly or sub-assemblies 32, and is powered by the power supply 26, which also supplies the emitter sub-assembly or sub-assemblies 32, but may alternatively be controlled by and/or be powered by a secondary processing system 20 or secondary power supply 26 (not shown), respectively. The motor may be statically attached to the mounting point or to another portion of the housing 12, wherein the motor may be operably coupled to the rotors 28 by a transmission, drivetrain, or other force-transfer mechanism. The motor is preferably an electric motor (e.g., brushed DC motor, permanent magnet DC motor, EC motor, AC-DC motor, induction motor, etc.), but may alternatively be any other suitable force-generation mechanism.

The receiver(s) 16 of the aerial system 10 functions to sample signals indicative of ambient environment data. The ambient environment data and/or sampled signals may subsequently be: sent to a user, analyzed for automatic flight instruction generation, or used in any other suitable manner.

The signals indicative of ambient environment data may be: light (e.g., in the visual range, IR, hyperspectral, multispectral, etc.), radiation (e.g., microwave, radio waves, etc.), sound (e.g., infrasonic, ultrasonic, etc.), or any other suitable signal. Receivers 16 that may be used include: cameras 30 (e.g., visual range, IR cameras, multispectral, hyperspectral, etc.), radiation receivers (e.g., radio receivers or antennas, microwave receivers or antennas, etc.), microphones, or any other suitable receiver. The receivers 16 may optionally include a signal-to-noise ratio (SNR) management system that functions to reduce the amount of noise in the recorded signal. The SNR management system may be configured to select for wavelengths emitted by the emitter 18 and reject all other wavelengths, or be otherwise configured. The signal-to-noise ratio management may include: a band-pass filter (e.g., mechanical band-pass filter; virtual band-pass filter, such as a filter wheel; etc.), a lock-in amplifier, frequency-selective filter (e.g., low-pass, band-pass, etc.), or any other suitable noise management system. The receiver(s) 16 may be controlled by the processing system 20 controlling the emitter 18 and powered by the power supply 26 supplying the emitter 18, but may alternatively be controlled by and/or be powered by a secondary processing system 20 or secondary power supply 26, respectively.

The receiver 16 is preferably arranged along the exterior of the housing 12, but may alternatively be arranged along the interior of the housing (e.g., be recessed), or be otherwise arranged. The receiver(s) 16 may be mounted to the housing 12, mounted to a substrate mounting the processing system 20 (e.g., a PCB), mounted to a gimbal or other actuation system, or be otherwise mounted to the system. The receiver(s) 16 are preferably individually indexed and controlled, but may be indexed and controlled as a set, or otherwise controlled.

The receiver(s) 16 may optionally include signal adjustment mechanisms that function to adjust the signal sampled by the receiver(s) 16. The signal adjustment mechanisms may include filters, lenses (e.g., wide angle lens, fisheye lens, diffusion lens, etc.), light pipes, audio funnels, or any other suitable mechanism. In one example, the signal adjustment mechanism includes a hood (not shown) that extends along an arcuate segment of a lens of the camera 30, wherein the hood may prevent or control glare from external light sources. The signal adjustment mechanism may be mounted to the receiver 16, to an opening in the housing 12 aligned or associated with the receiver 16, or be otherwise configured. The receiver(s) 16 may optionally include or be connected to dedicated signal processing chips (e.g., on the processing system, separate from the processing system, etc.) that function to process the signal sampled by the receiver 16 (e.g., dewarp the image, reduce noise in the signal, etc.).

The aerial system 10 may include one or more receivers 16 of the same or differing type. In one variation, the aerial system 10 includes a first receiver 16 adjacent a second receiver 16 on a common face of the housing 12 (see FIG. 3). The first and second receivers 16 may be separated by a predetermined distance and form a stereoreceiver (e.g., a stereocamera). In this variation, the aerial system 10 may include an emitter 18 arranged adjacent the first and second receivers 16, e.g., between the first and second receivers 16, adjacent the first receiver 16 opposing the second receiver 16, offset from an axis shared by the first and second receivers 16, etc.), or include any other suitable component.

In a second variation, the aerial system 10 includes first and second receivers 16 arranged on the same face. The first and second receivers 16 sample different signals (e.g., visible range and IR, respectively). The signal streams from the first and second receivers 16 may be selectively used for different applications, e.g., the visible range images sent to the user while the infrared images are used for depth mapping and/or human subject identification.

In a third variation, the aerial system 10 includes a front receiver 16 and a bottom receiver 16 arranged along the front and bottom of the housing 12, respectively. For example, the second receiver 16 may be arranged proximal the front, middle, or back of the housing 12. In this variation, the front receiver signal stream may be sent to a user device, and the bottom receiver signal stream may be processed on-board to automatically generate flight instructions (e.g., landing instructions). The front and bottom receivers 16 may be of the same type (e.g., both visible range cameras) or different types (e.g., wherein the front receiver 16 is a visible range camera and the bottom receiver 16 includes an infrared camera; wherein the front receiver 16 is a visible range camera and the bottom receiver 16 is a sonar system; etc.). However, the aerial system 10 may include any suitable number of receivers 16 of any suitable type in any other suitable configuration.

The emitter 18 of the aerial system 10 functions to adjust the signal sampled by the receiver 16. The emitter 18 may optionally function as a visual indicator to a user remotely controlling the system 12.

Each emitter 18 is preferably paired with a receiver 16 configured to sample signals of the type emitted by the emitter 18, but may alternatively be paired with any other suitable receiver 16. The emitter-receiver pair 16, 18 may form a sensing module, or be otherwise associated. Each receiver 16 may be associated with (e.g., receive signals emitted by) one or more emitters 18, and each emitter 18 may be associated with (e.g., emit signals received by) one or more receivers 16. Examples of sensing modules include: LIDAR, SONAR, RADAR, 3D scanners, or any other suitable sensing module. The emitter(s) 18 and receiver(s) 16 in a sensing module are preferably substantially collocated (e.g., arranged along the same housing face, housing end, etc.), but may alternatively be distributed about the housing 12 (e.g., wherein the emitter 18 and the receiver 16 are on opposing ends of the housing 12; wherein the signal may be guided toward the region monitored by the receiver 16 by light pipes or other signal adjustment mechanism; etc.). For example, the emitter(s) 18 may be arranged adjacent the paired receiver 16 (e.g., within a threshold distance, separated by a distance determined based on the signal wavelength, etc.), surround all or a portion of the receiver 16 (e.g., extend along an arcuate segment tracing the receiver perimeter), be arranged along a first and second side of the receiver 16, be offset from the receiver active surface (e.g., be recessed relative to the receiver active surface, be proud relative to the receiver active surface, etc.), or be otherwise related to the paired receiver 16.

Figure 3:
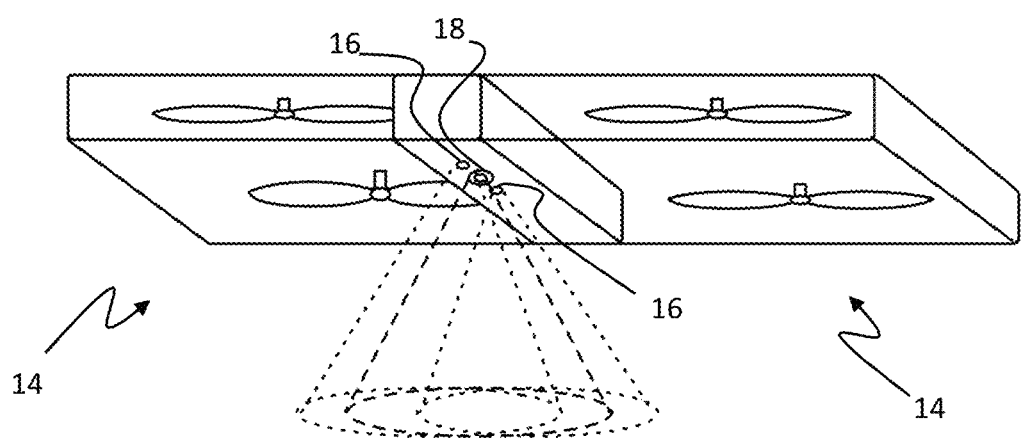
FIG. 3 is a schematic representation of a second example of the aerial system in operation.

As shown in FIG. 3, the emitter(s) 18 and receiver(s) 16 of the sensing module are preferably directed toward the same external monitored region (e.g., target region), but may alternatively be directed toward different, overlapping, or otherwise related external monitored region. The monitored region (e.g., physical area and/or volume) covered by the signal emitted by the emitter 18 is preferably larger than and fully or partially encompasses the physical area monitored by the receiver 16, but may alternatively be smaller or substantially equal to the physical area monitored by the receiver 16.

The emitter(s) 18 may be a light source, a sound source, an electromagnetic radiation source, or be any other suitable emitter 18.

Examples of light sources include: LEDs (e.g., white LEDs, red LEDs, green LEDs, blue LEDs, IR LEDs, UV LEDs, etc.), laser diodes, incandescent lights, halogen lights, or any other suitable light source. The emitted light may be diffuse, collimated, or have any suitable property. The emitted light may be substantially uniform (e.g., dispersed) across a physical region, be patterned in an array (e.g., a grid, lines, concentric circles, etc.), or otherwise patterned. The emitted light may be modulated (e.g., to communicate data, to identify the emitter 18, etc.) or unmodulated. The emitted light may be narrow band, wide band, hyperspectral, multispectral, or have any other suitable set of wavelengths. However, the emitted light may have any suitable parameter. Parameters of the light source that may be controlled include: flux, intensity, illuminance, luminance, wavelength (e.g., saturation, hue, excitation purity, etc.), or any other suitable parameter. The combination of an optical sensor (e.g., camera) and one or more light emitters 18 may form a vision location system, image recordation system, depth mapping system, or any other suitable light-based sensing module.

Examples of sound sources include: a speaker (e.g., infrasonic transmitter, ultrasonic transmitter, etc.), or any other suitable sound source. The emitted sound may be collimated, dispersed, or have any other suitable property. The emitted sound may be modulated or unmodulated. The emitted sound may be substantially uniform across a physical area, be patterned (e.g., concentrated into a given area), or otherwise spatially distributed. Parameters of the emitted sound that may be controlled include: amplitude, wavelength, directionality, or any other suitable parameter. The combination of a sound sensor (e.g., a microphone) and one or more sound emitters 18 may form an acoustic location system, acoustic recordation system, depth mapping system, or any other suitable acoustic-based sensing module.

Examples of electromagnetic (EM) radiation sources include: microwave emitters 18, radio wave emitters 18, or any other suitable electromagnetic radiation source. The emitted electromagnetic radiation may be collimated, dispersed, or have any other suitable property. The emitted electromagnetic radiation may be substantially uniform across a physical area, be patterned (e.g., concentrated into a given area), or otherwise spatially distributed. The emitted electromagnetic radiation may be modulated or unmodulated. Parameters of the emitted electromagnetic radiation that may be controlled include: amplitude, wavelength, directionality, or any other suitable parameter. The combination of an electromagnetic radiation sensor (e.g., a RF antenna) and one or more electromagnetic radiation emitters 18 may form an EM location system, EM recordation system, depth mapping system, or any other suitable EM-based sensing module.

The emitter(s) 18 may additionally include a signal adjustment mechanism that functions to adjust one or more parameters of the emitted signal. Signal adjustment mechanisms may include: signal routing mechanisms, lenses, filters, amplifiers, or any other suitable mechanism.

The emitter(s) 18 may additionally include a cooling mechanism that functions to cool the emitter 18. The cooling mechanism may be: the lift mechanism 14, a fan fluidly connected to the emitter 18, a set of heatsinks thermally connected to the emitter 18, or any other suitable cooling mechanism.

The system may include one or more emitters 18 of the same or different type. The emitter 18 may be the same as or different from a recording emitter 18 (e.g., emitter 18 configured to emit signals for sensor recordation), a signaling emitter 18 (e.g., emitters 18 required to meet regulations or for user reference, such as indicator lights), or any other suitable emitter 18.

The emitter(s) 18, individually but alternatively in aggregate, preferably have a form factor smaller than a predetermined proportion of the housing 12 and/or overall system (e.g., less than 40%, 20%, 10%, 5%, etc.), but may alternatively have a form factor larger than a predetermined proportion of the housing 12 and/or overall system or have any other suitable form factor. The emitter(s) 18, individually but alternatively in aggregate, preferably has a mass (or weight) less than a predetermined proportion of the aerial system mass or weight (e.g., less than 50%, 30%, 20%, 10%, 5%, etc.), but may alternatively have a mass larger than a predetermined proportion of the aerial system mass or have any other suitable mass. The emitters 18 may be arranged, selected, and/or configured such that the aerial system weight is substantially evenly distributed about a central axis (e.g., longitudinal, lateral, etc.), but may alternatively be configured such that the aerial system weight is unevenly distributed.

The emitter(s) 18 may be mounted to the processing system substrate (e.g., the PCB supporting the processing system), but may alternatively be mounted to: the housing 12, a separate PCB, a receiver sub-assembly, the lift mechanism 14, or to any other suitable component. When the emitter 18 is recessed within the housing 12, the emitter 18 may be aligned with a housing 12 opening, connected to a signal routing system (e.g., a manifold defined by the housing 12; a signal pipe, such as a light pipe or wire; mirror system; etc.) that connects the emitter 18 to the housing exterior, or otherwise connected to the housing exterior. The emitter 18 is preferably mounted proximal the receiver 16 configured to sample signals of the type emitted by the emitter 18, but may alternatively be mounted in any other suitable location (e.g., wherein a signal routing system routes the signal to the region monitored by the receiver 16).

The emitter(s) 18 may be powered by the power supply 26 supplying the lift mechanism 14, but may alternatively be powered by a secondary power supply 26, or by any other suitable power supply 26.

The emitter(s) 18 may be controlled by the processing system 20 controlling the lift mechanism 14, controlled by a secondary processing system 20, or otherwise controlled. The emitter(s) 18 may be controlled using instructions generated on-board the system (e.g., by the processing system, based on receiver signals, auxiliary sensor signals, external data, etc.), but may alternatively be controlled (partially or entirely) based on remote-control instructions received from a remote device, e.g., a user device, a server system, etc. . . . (not shown) or otherwise controlled. Parameters associated with the operation of the emitter(s) 18 that may be controlled include: signal emission intensity, wavelength, duration, frequency, coverage region, directionality, emitter identity, or any other suitable emitter operation parameter.

When the system includes a plurality of emitters 18, the emitters 18 may be individually indexed and controlled (e.g., by the same or different processing systems), or be controlled together as a set. The emitters 18 controlled together as a set may be emitters 18 of the same type, be emitters 18 associated with the same drone subsystem (e.g., associated with the same sensing module, associated with the same camera, etc.), emitters 18 mounted to the same portion of the housing 12, or emitters 18 that are otherwise related.

The plurality of emitters 18 may be arranged in an array, grid, ring, set of concentric rings, in rows, in columns, or otherwise arranged. The plurality of emitters 18 may be split into one or more subsets, wherein different subsets are independently controlled, arranged on different regions of the housing 12, or otherwise differentiated. Each subset may include one or more emitters 18, wherein the emitters 18 in the same subset may be directed toward the same monitored volume, or toward different monitored volumes. The plurality of emitters 18 in each subset may include the same emitter type, be different emitter types, or be otherwise related. In a first example, an emitter subset may include both visible range and IR light emitting elements (e.g., LEDs). In a second example, an emitter subset may include both light emitting elements and sound-emitting elements. However, the subsets may be otherwise constructed.

The processing system 20 of the aerial system 10 functions to control operation of the emitter(s) 18. For example, the processing system 20 may control emitter operation to improve receiver signal capture for subsequent analysis. In a specific example, the processing system 20 may control on-board lighting to improve the quality of images captured by the on-board camera 30 for subsequent computer-vision analysis (e.g., localization analysis). The processing system 20 may additionally control aerial system flight (e.g., based on remote control instructions, based on automatically generated instructions, etc.), determine aerial system operation context, optimize system component operation for a set of given variables (e.g., power consumption, heat management, noise, etc.), or perform any other suitable functionality. The processing system 20 may include: one or more processors, memory, or any other suitable component.

Figure 4:
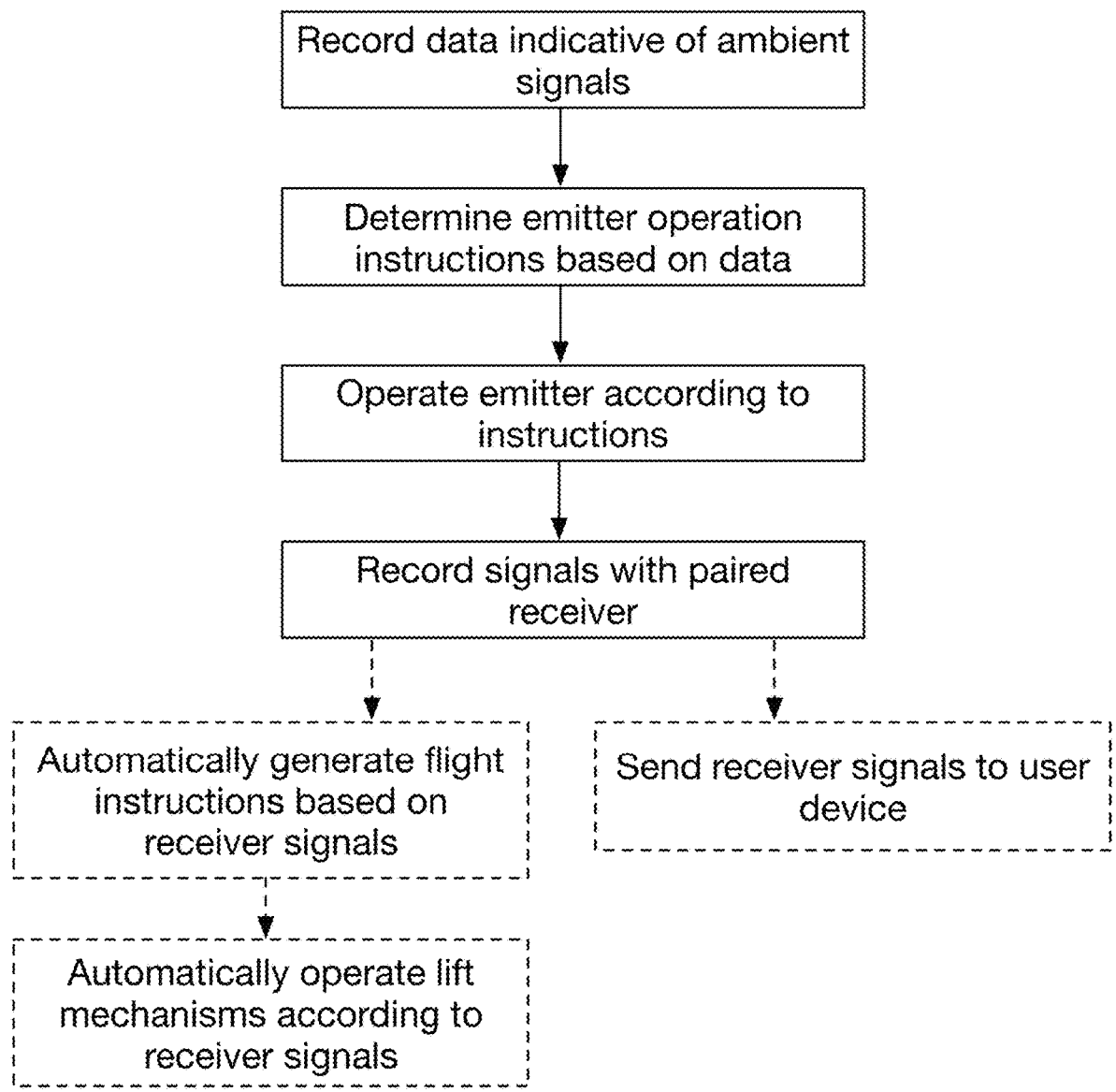
FIG. 4 is a schematic representation of aerial system operation.

As shown in FIG. 4, the processing system 20 may be configured to: receive signals recorded by aerial system sensors and/or receivers 16, analyze the signals, and dynamically control emitter operation based on the signal analysis to meet a target parameter. The processing system 20 may optionally be configured to: determine an aerial system operation context, wherein the emitter operation may be controlled based on the operation context. The processing system 20 may optionally be configured to: automatically generate flight instructions based on the signals and automatically control the aerial system 10 based on the flight instructions. However, the processing system 20 may be otherwise configured.

Receiving signals recorded by aerial system sensors and/or receivers 16 functions to receive data indicative of: the ambient environment (e.g., light, temperature, pressure, obstacles, maps, geographic location, etc.), aerial system operation, aerial system relationship with the ambient environment (e.g., distance away from an object, etc.), or any other suitable information. The signals may be received by the processing system 20 from auxiliary sensors 22, the receiver(s) 16, external sensors (e.g., user device sensors, such as a user device camera), or from any other suitable source. The signals may optionally be streamed to a remote device (e.g., user device).

Analyzing the signals functions to determine information about aerial system operation, the ambient environment, or other parameters. The signals are preferably analyzed by the processing system 20, but may alternatively or additionally be analyzed by an external system. Signal analysis may additionally or alternatively function to determine how emitter operation should be adjusted. Signal analysis may include: amplitude determination, wavelength determination, pattern determination, or any other suitable signal analysis. In some variations, signal analysis may include image analysis, which may include parameter determination, feature extraction, segmentation, object recognition, motion analysis, optical flow analysis, scene reconstruction, localization analysis, or any other suitable image analysis. Examples of object detection methods that may be used include: Cascaded classification, a WaldBoost detection, or any other suitable object detection method. Examples of feature detection methods that may be used include: Harris corner detection, Shi-Tomasi corner detection, SIFT (scale-invariant feature transform), SURF (speeded-up robust features), FAST corner detection, BRIEF (binary robust independent elementary features), ORB (oriented FAST and rotated BRIEF), AKAZE, or any other suitable feature detection method. Examples of localization analysis include: Simultaneous Localization and Mapping (SLAM), Kalmann Filters, Rao-Blackwellized particle filters, Extended Kalmann Filter, bundle adjustment, smoothing or batch methods, Incremental Smoothing and Mapping, Parallel Tracking and Mapping, KLT (Kanade-Lucas-Tomasi), KCF (Kernelized correlation filters), TLD (Tracking-learning-detection), or other localization analyses (e.g., feature and/or object tracking methods). Features that may be tracked include: LBP (local binary patterns histograms), HOG (histogram of oriented gradients), HAAR features, or any other suitable feature. Examples of optical flow analyses that may be used include: PyrLK algorithm, "SimpleFlow" algorithm, DeepFlow algorithm, StereoBM algorithms, StereoSGBM algorithms, or any other suitable optical flow analysis method. The extracted data (e.g., identified features, tracked objects, etc. may be virtually modeled or otherwise used. Examples of extracted data virtual modeling methods that may be used include: SFM (structure from motion), Camera calibration method, Real time pose estimation: PNP algorithm, StereoBM (stereo correspondence using the block matching algorithm), Epipolar geometry, SLAM (simultaneous localization and mapping), Bundle adjustment, RANSAC (random sample consensus), Triangulation methods, ICP (iterative closest point), or any other suitable modeling method. However, any other suitable signal analysis may be performed.

In a first variation, the sensed data or sensor data is processed into ambient environment topography. In a first example, the aerial system 10 may include first and second emitter(s) 18 (e.g., light) on either side of a receiver 16 (e.g., camera 30). The processing system 20 may alternate first and second light operation, wherein images recorded by the camera 30 (using the light form the first and second lights) and the respective light operation times may be used to map the ambient environment topography (e.g., using depth mapping analyses). In a second example, the aerial system 10 may include a set of emitters 18 arranged between a first and second receiver 16 arranged on either side of the emitter set (e.g., wherein the first and second receivers 16 cooperatively form a stereoreceiver). The ambient environment topography may be determined based on images from the first and second receivers 16, wherein the images may be recorded concurrently or within a threshold time of each other. However, ambient environment topography may be otherwise determined.

In a second variation, the sensor data is processed into a relationship between the ambient environment and the aerial system 10, such as the distance between the aerial system 10 and an external surface or object. In a first example, the distance may be determined based on auxiliary sensors 22

(e.g., altimeter, proximity sensor, etc.). In a specific example, the distance between the aerial system 10 and a landing surface may be determined using an altimeter. Additionally or alternatively, the sensor data may be processed to classify the type of landing surface. For example, if the IR camera records intense IR signals, the landing surface may be classified as a hand and the IR and/or visual images may be analyzed to determine the landing parameters (e.g., speed, angle, etc.). However, the sensor data may be otherwise processed. In a second specific example, the distance between the aerial system 10 and an object in the flight path may be determined using a proximity sensor. However, the distance may be otherwise determined from auxiliary sensor measurements. In a second example, the distance may be determined based on receiver signals. In a first specific example, the aerial system 10 may include a camera 30 as a receiver 16 and a visual range light emitter 18. The distance may be determined based on the size of a known reference point detected from the camera image. Alternatively, the aerial system 10 may additionally include a second light emitter 18 (e.g., collimated light, IR, etc.), wherein the recorded emitted light pattern has a predetermined relationship with distance (e.g., size of the light spot increases with distance, distance between adjacent laser grids increase with distance, etc.). The distance may be determined based on the recorded light pattern and the predetermined relationship. Alternatively, the distance may be determined using machine learning and/or computer vision techniques (e.g., calculating a probability that the detected object is a certain size, calculating a probability for a set of possible distances, etc.). Examples of machine learning methods that may be applied include: DNN (deep neural networks), CNN (Convolutional neural network), SVM (support vector machine), K-means, EM (expectation maximization algorithm), PCA (Principle component analysis), Boosting, AdaBoost (Adaptive boost), or any other suitable machine learning method. However, the distance may be otherwise determined.

In a third variation, the sensor data is processed into an ambient environment parameter. The sensor data may be auxiliary sensor data, receiver data, or any other suitable data. In a first example, the ambient environment light may be determined using an ambient light sensor arranged on the housing exterior or aligned with a housing opening. In a second example, the ambient environment light may be determined from the camera image. However, the parameters may be otherwise determined from the sensor data.

Figure 5:
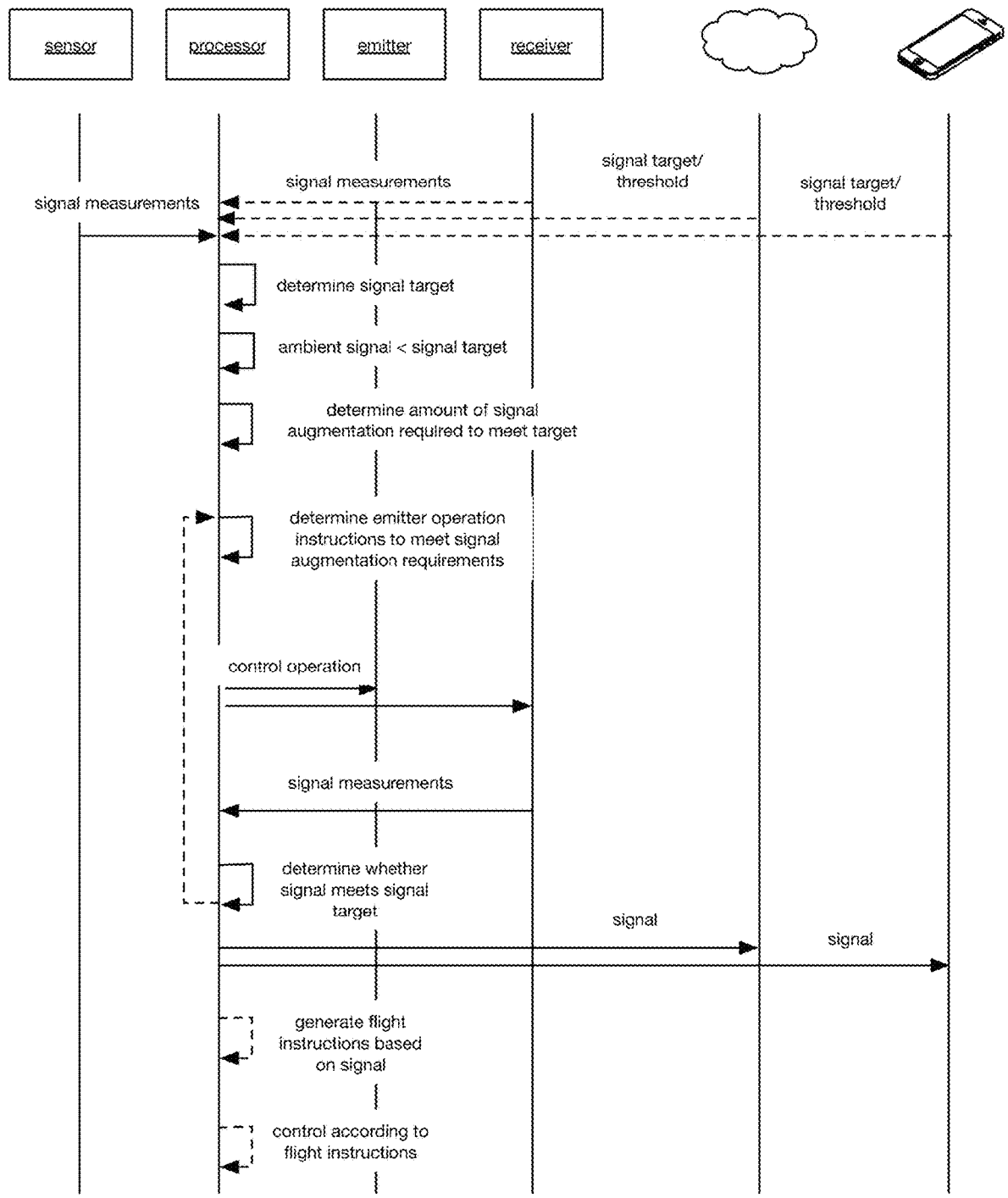
FIG. 5 is a schematic representation of a first example of dynamic emitter control.

Dynamically controlling emitter operation based on the signal analysis functions to meet a target signal parameter. The target signal parameter may be specified by the operation mode, the operation context, the user device, the user preferences, or otherwise determined. The target signal parameters may be received (example shown in FIG. 5), retrieved, automatically learned (e.g., based on past manual adjustments, past applied filters, etc.), calculated (e.g., based on a confidence probability), or otherwise determined. The target signal parameter may be a target parameter for the external, target object, or be a target parameter for emitter operation. In a first variation, the processing system 20 may calculate the difference between the emitter signal parameter value (as determined from the received signals) and the target emitter signal parameter value, determine (e.g., calculate, select, etc.) the emitter operation setting (e.g., power to be supplied, etc.) based on the difference, and control the emitter 18 to operate according to the determined emitter operation setting. In a second variation, the processing system 20 may iteratively adjust emitter operation until the measured signal falls within a target range. However, the emitter operation may be otherwise determined.

Figure 9:
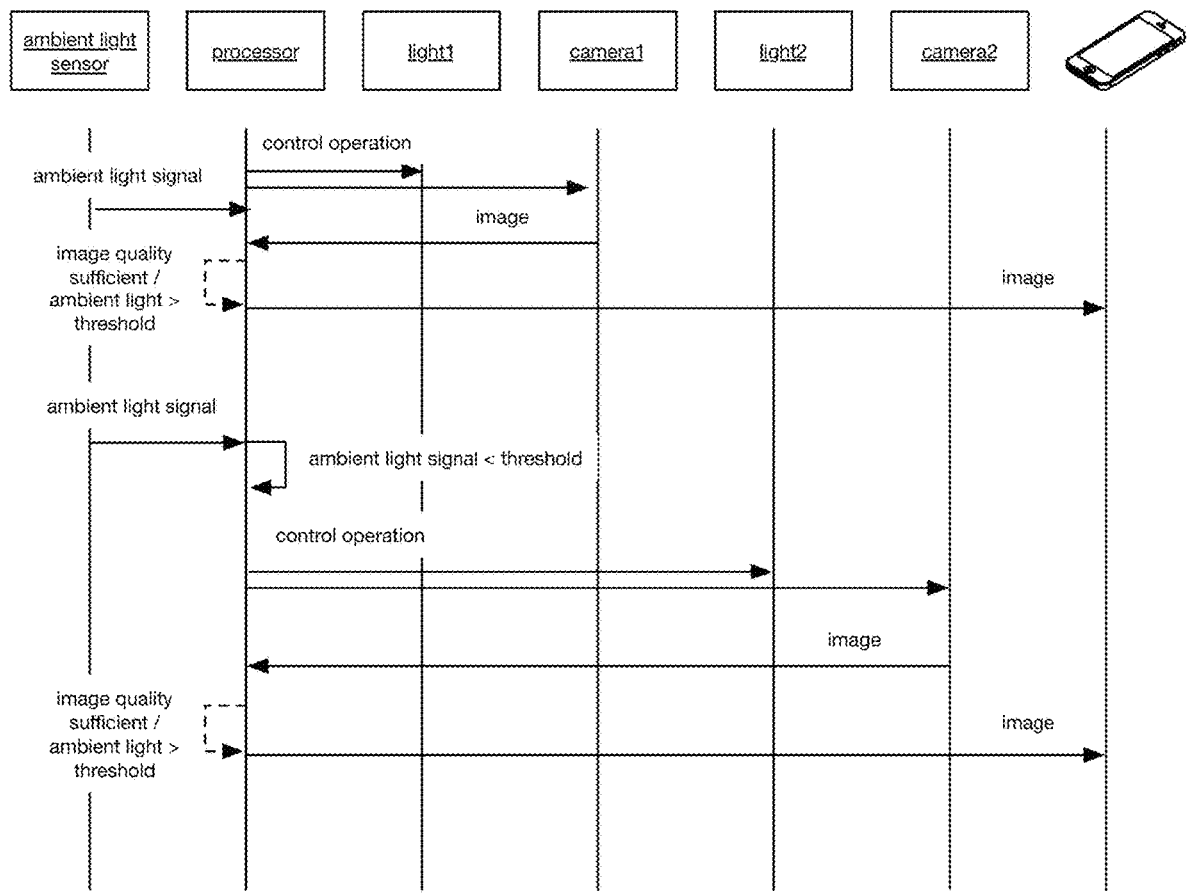
FIG. 9 is a schematic representation of a fifth example of dynamic emitter control to accommodate for low-light image recordation conditions.

In a first example, the intensity of light emitted by a visual range light may be selectively increased as an inverse function of ambient light, such that the target object receives a predetermined range of incident light (example shown in FIG. 9). In a second example, the intensity of light emitted by a light emitter 18 (e.g., visual range, IR, etc.) is adjusted as a function of aerial system distance from a landing region (e.g., wherein the further the landing region is, the higher the light intensity emitted by the emitter 18). In a third example, the intensity of light emitted by a visual range light may be selectively adjusted to achieve a predetermined set of image parameters (e.g., prevent oversaturation or washout; achieve a predetermined color or hue palette, as determined from historic user filters applied to past images, historic images viewed by the user on social networks or the Internet; etc.). However, the emitter 18 may be otherwise adjusted based on the sensor signals.

Operation of the receiver 16 associated with the emitter 18 (e.g., paired with the emitter 18) may be tied to operation of the emitter(s) 18 (e.g., be powered when the emitter 18 is powered), or be independent of operation of the emitter(s) 18. For example, a visual range camera may be concurrently operated with a visual range light emitter 18, while an IR camera may be concurrently operated with an IR light emitter 18. However, the receiver 16 may be otherwise operated.

Context functions associated with the operation of the aerial system 12 may be determined and used to determine the target parameters for emitter 18, lift mechanism 14, and/or other aerial system component operation. The context may be received (e.g., from a user device, through an operation mode selection, etc.), automatically determined (e.g., based on sensor data, receiver data, external data, user flight history, etc.). In one example, the aerial system context may be automatically determined based on the ambient noise and the ambient light. In a specific example, a stealth mode may be automatically determined when the ambient noise and ambient light drops below a threshold level. In this mode, the visual range lights may be selectively shut off and the IR light may be selectively turned on. In a second specific example, long-term aerial system operation (and/or anticipated flight duration) may be determined based on historic user aerial system use patterns, wherein the processing system may automatically optimize component operation to achieve the anticipated flight parameters. However, the context may be otherwise determined and used.

Figure 10:
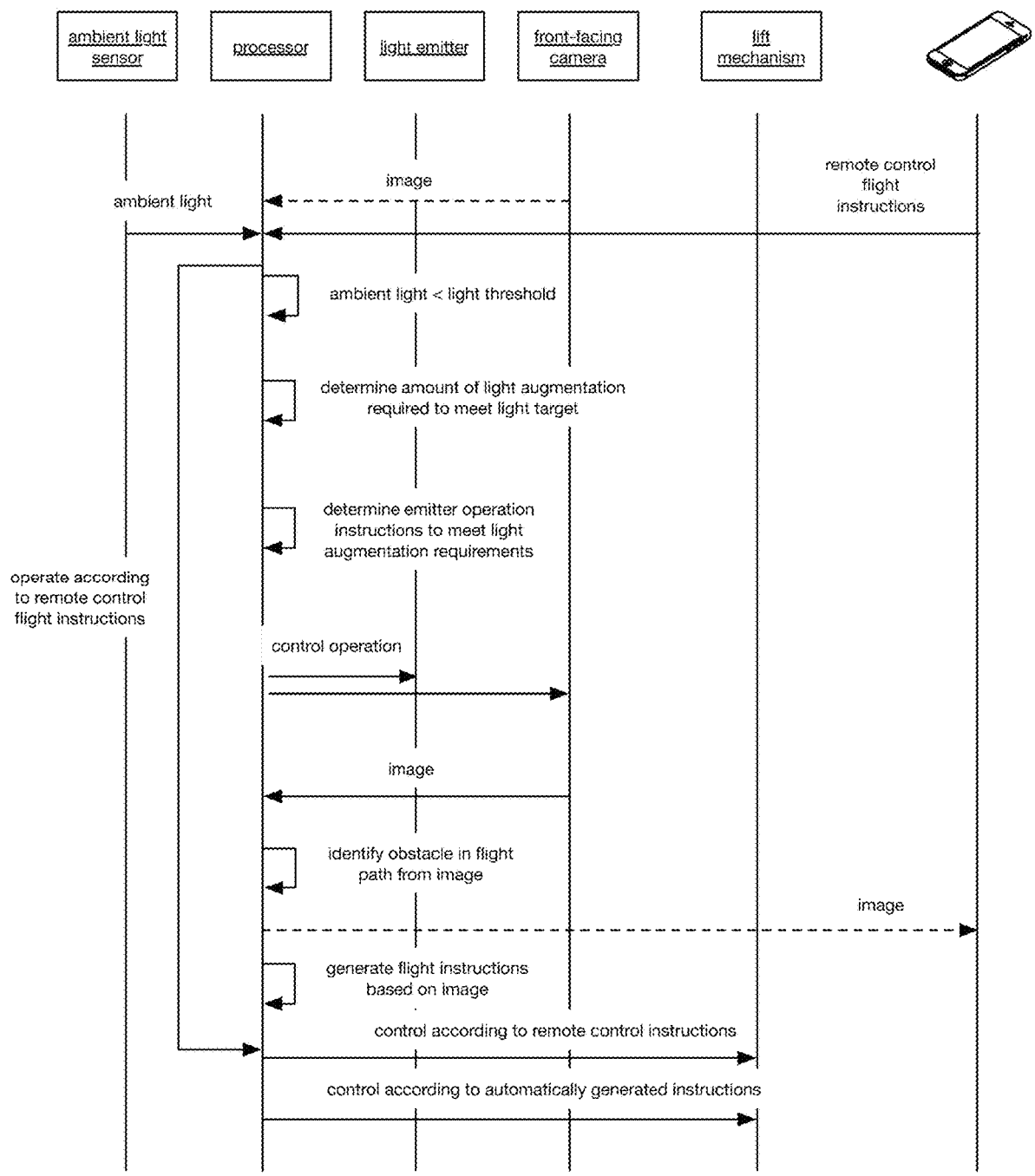
FIG. 10 is a schematic representation of a sixth example of dynamic emitter control use in selective remote control flight instruction overriding.

Automatically generating flight instructions based on the signals and automatically control the aerial system 10 based on the flight instructions functions to automatically fly the aerial system 10. The flight instructions are preferably determined based on the receiver signals, but may alternatively or additionally be based on auxiliary signals, external data, or be based on any other suitable information. These automatically generated flight instructions may override remote control instructions, be used in the absence of remote control instructions, or be otherwise used. In a first variation, the processing system 20 may dynamically adjust emitter operation to identify objects in its flight path from the receiver signals (e.g., from the images recorded by the camera 30), and automatically generate flight instructions (e.g., swerve instructions, halt instructions, etc.; example shown in FIG. 10) to avoid or otherwise interact with the objects. However, flight instructions may be otherwise generated or used.

Figure 6:
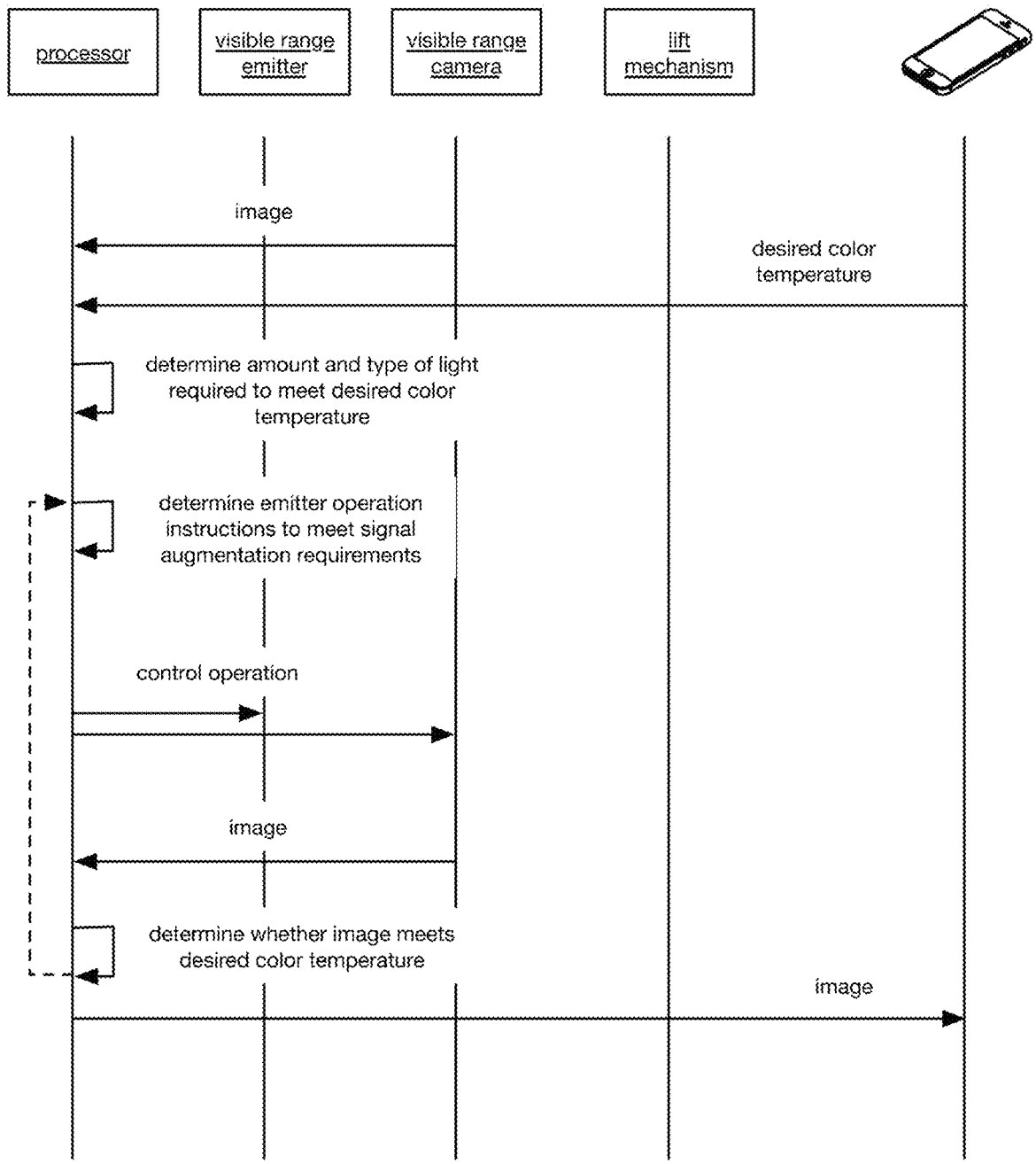
FIG. 6 is a schematic representation of a second example of dynamic emitter control based on target image parameters received from a user device.

In a first variation of aerial system operation, the system is controlled (e.g., performed by the processing system 20 and/or cooperatively performed by a remote device) to record images satisfying a predetermined set of parameters. These images may be sent to the user (e.g., user device, as shown in FIG. 6), used for computer vision analyses, or otherwise used. In a first example, in response to ambient light falling below a threshold level (e.g., determined using an ambient light sensor, the image recorded by the receiver 16, etc.), the processing system 20 may switch from operating a first emitter subset to operating a second emitter subset, wherein the first emitter subset is associated with normal light conditions and the second emitter subset is associated with low-light conditions. This example may optionally include switching from operating a first receiver 16 to operating a second receiver 16, wherein the first emitter subset is associated with the first receiver 16 and the second emitter subset is associated with the second receiver 16. In a second example, the processing system 20 may receive the receiver signal, determine a signal quality, and automatically adjust emitter operation to get a better signal. In a specific example, the processing system 20 may receive an image from the camera 30, analyze the image quality (e.g., saturation, hue, white balance, etc.), and automatically adjust a visible range light emitter 18 until the image substantially satisfies a predetermined set of metrics (e.g., saturation, hue, white balance, etc.). The metrics may be: a predetermined parameter set, determined based on user preferences, determined based on past adjustments on the images, determined based on images viewed on social network or browsing history, or otherwise determined. In a third example, the processing system 20 may automatically cycle the emitter 18 though a predetermined operation cycle. However, the images may be otherwise captured.

Figure 7:
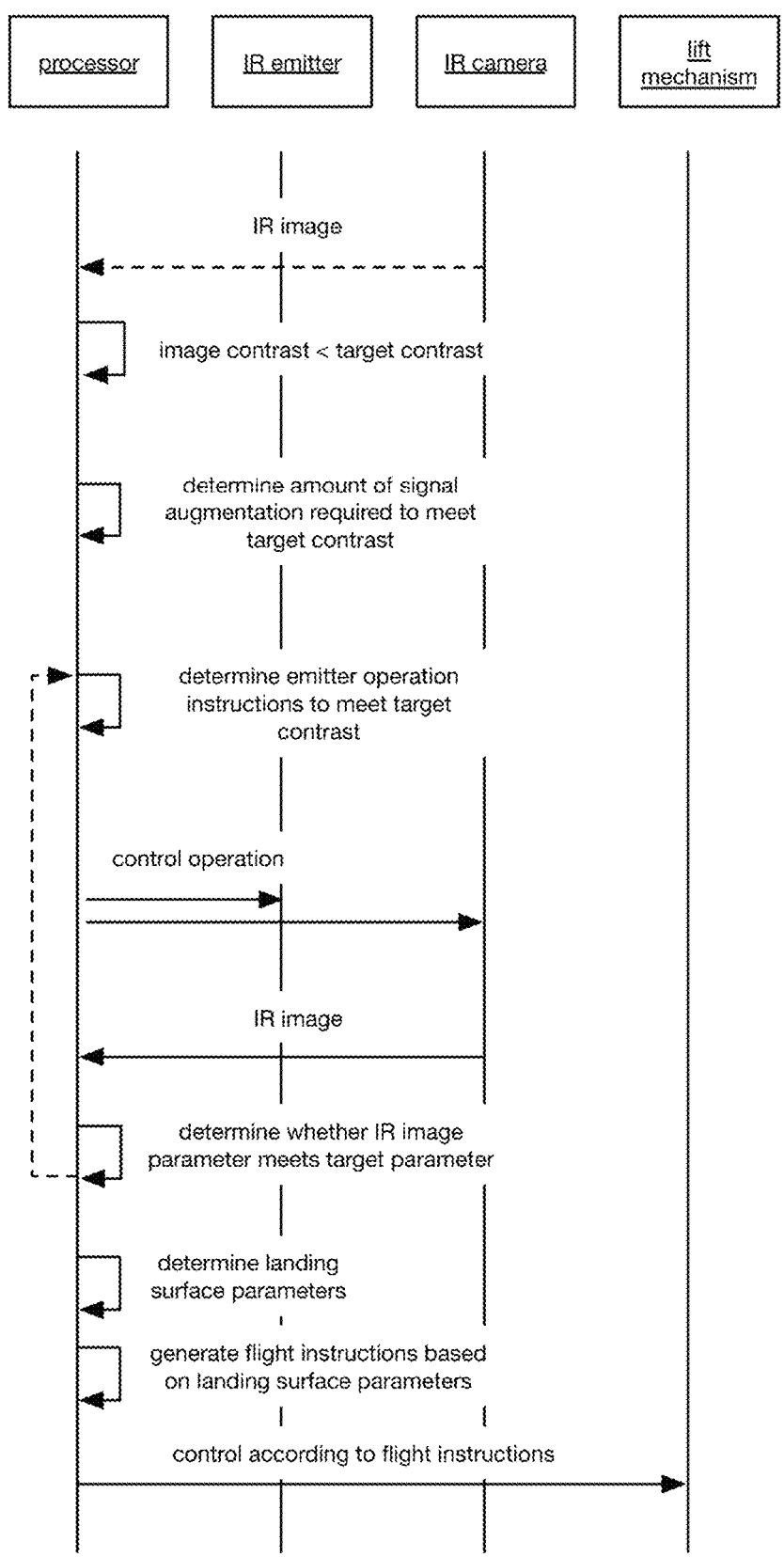
FIG. 7 is a schematic representation of a third example of dynamic emitter control use in landing instruction generation.
Figure 8:
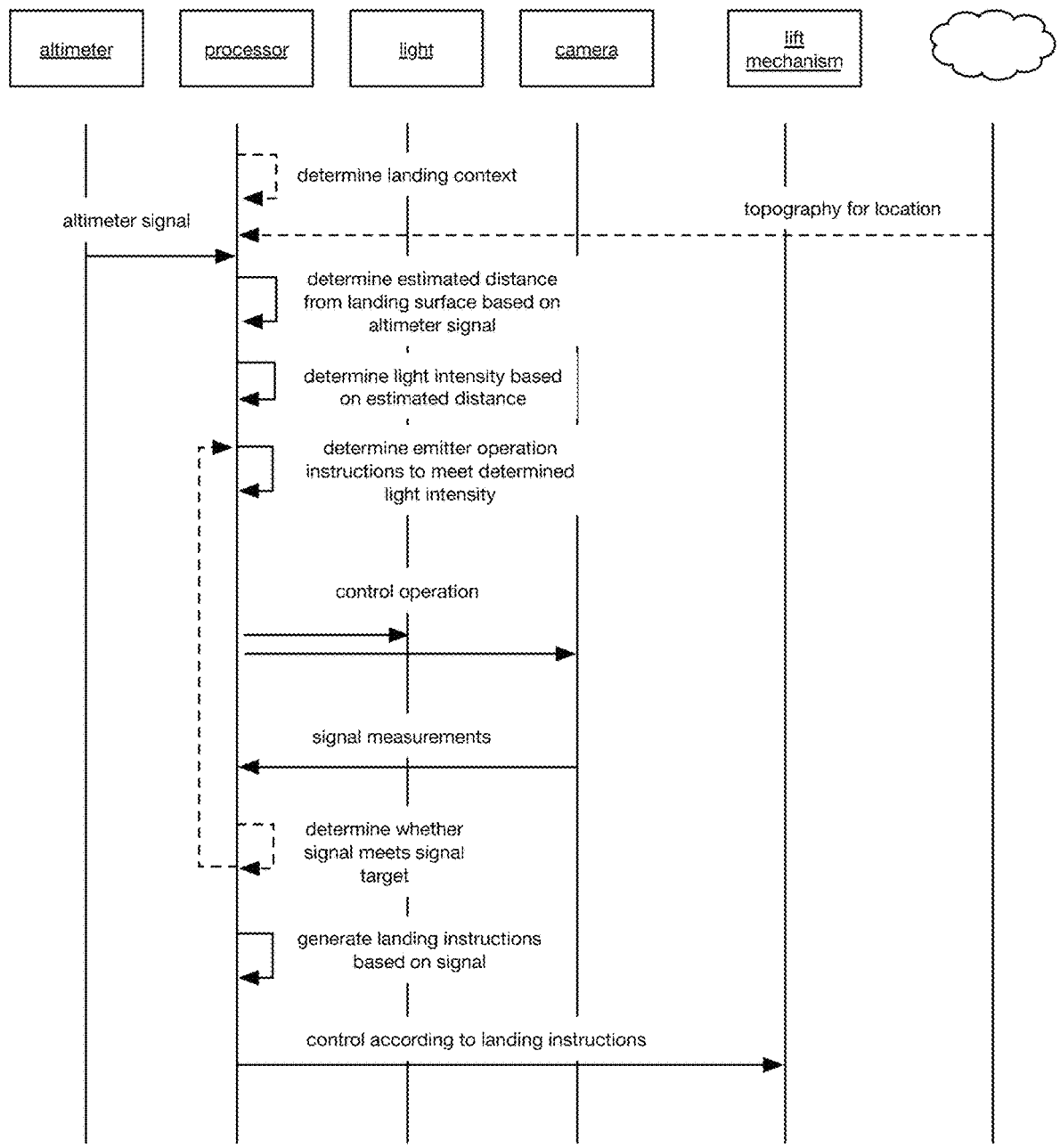
FIG. 8 a schematic representation of a fourth example of dynamic emitter control to illuminate a landing surface to a threshold level for automated landing instruction determination.

In a second variation of aerial system operation, the system is controlled (e.g., performed by the processing system 20 and/or cooperatively performed by a remote device) to record images for automated landing (example shown in FIG. 7). In this variation, the system may automatically: determine an aerial system distance away from a landing surface (e.g., based on an altimeter, example shown in FIG. 8; the image recorded by a downward-facing camera 30; etc.), control the light emitter 18 to emit light as function of distance, generate landing instructions based on image recorded using the emitted light, and control the lift mechanism 14 to land the aerial system 10 on the landing surface. Light emitter operation parameters may be determined based on: the estimated distance between the aerial system 10 and the landing surface (e.g., determined using the altimeter, the image recorded by the camera 30, etc.), the landing surface topography (e.g., based on the image recorded by the camera 30), the ambient light, and/or any other suitable information. However, the aerial system 10 may be otherwise controlled.

The aerial system 10 may additionally include a power supply 26, which functions to power the active components of the aerial system 10 (e.g., lift mechanism's motors, power supply 26, etc.). The power supply 26 may be mounted to the housing 12 and connected to the active components, or be otherwise arranged. The power supply 26 may be a rechargeable battery, secondary battery, primary battery, fuel cell, an external power supply (e.g., RF charger, induction charger, etc.), an energy harvesting system (e.g., solar), or be any other suitable power supply. The power supply 26 may be cooled using the flow from the rotors 28, cooled using a secondary fan, or otherwise cooled.

The aerial system 10 may additionally include sensors, which function to acquire signals indicative of the aerial system's ambient environment and/or aerial system operation. The sensors are preferably mounted to the housing 12, but may alternatively be mounted to any other suitable component. The sensors are preferably powered by the power supply 26 and controlled by the processing system 20, but may be connected to and interact with any other suitable component. The sensors may include one or more: cameras 30 (e.g., CCD, CMOS, multispectral, visual range, hyperspectral, stereoscopic, IR, etc.), orientation sensors (e.g., accelerometer, gyroscope, altimeter), audio sensors (e.g., transducer, microphone, etc.), light sensors, temperature sensors, current sensor (e.g., Hall effect sensor), magnetometer, air flow meter, voltmeters, touch sensors (e.g., resistive, capacitive, etc.), proximity sensors, force sensors (e.g., strain gauge meter, load cell), vibration sensors, chemical sensors, location sensor (e.g., GPS, GNSS, triangulation, etc.), IMUs, or any other suitable sensor. In one variation, the aerial system 10 includes a first camera 30 mounted (e.g., statically or rotatably) along a first end of the aerial system 10 housing 12 with a field of view intersecting the lateral plane of the housing 12; a second camera 30 mounted along the bottom of the aerial system 10 housing 12 with a field of view substantially parallel the lateral plane; and a set of orientation sensors, such as an altimeter and accelerometer. The sensors may be part of the processing system 20, separate from the processing system 20, or otherwise related to the processing system 20. The sensors may be cooled using the flow from the rotors 28 or otherwise cooled. However, the aerial system 10 may include any suitable number of any sensor type.

The aerial system 10 may additionally include a communication system 36, which functions to communicate with one or more remote computing systems. The communication module 24 may be a long-range communication module 24, a short-range communication module 24, or any other suitable communication module 24. The communication module 24 may facilitate wired and/or wireless communication. Examples of the communication module include a 802.11x, Wi-Fi, Wi-Max, NFC, RFID, Bluetooth, Bluetooth Low Energy, ZigBee, cellular telecommunications (e.g., 2G, 3G, 4G, LTE, etc.), radio (RF), wired connection (e.g., USB), or any other suitable communication module or combination thereof. The communication system 36 is preferably powered by the power supply 26, but may be otherwise powered. The communication system 36 is preferably connected to the processing system 20, but may additionally or alternatively be connected to and interact with any other suitable component. The communication system 36 may be part of the processing system 20, separate from the processing system 20, or otherwise related to the processing system 20. The communication system 36 may be cooled using the flow from the rotors 28 or otherwise cooled.

The aerial system 10 may additionally include inputs (e.g., microphones, cameras, etc.), outputs (e.g., displays, speakers, light emitting elements, etc.), or any other suitable component.

Although omitted for conciseness, the preferred embodiments include every combination and permutation of the various system components and the various method processes, wherein the method processes may be performed in any suitable order, sequentially or concurrently.

As a person skilled in the art will recognize from the previous detailed description and from the figures and claims, modifications and changes may be made to the preferred embodiments of the invention without departing from the scope of this invention defined in the following claims.

What is claimed is:

1. An aerial system, comprising:
a body;
a lift mechanism coupled to the body and configured to controllably provide lift and/or thrust;
a processing system configured to control the lift mechanism to provide flight to the aerial system; and
a vision location system coupled to the body, comprising:
a camera configured to obtain one or more images of an environment proximate the aerial system, and
an emitter and a receiver, the receiver being configured to sense data related to an ambient environment associated with the aerial system,
the vision location system being further configured to send at least one signal to the processing system, wherein the at least one signal includes the sensed data and the one or more images;
the processing system being further configured to control a controllable parameter of the emitter as a function of the at least one signal, wherein the controllable parameter is flux, and
the processing system being further configured to analyze the at least one signal to determine one of a position, an altitude, and an orientation of the aerial system.

2. The system of claim 1, wherein the camera is downward-facing.

3. The system of claim 1, wherein the emitter is downward-facing.

4. The system of claim 1, wherein the emitter is configured to emit visible light.

5. The system of claim 4, wherein the emitter is one of: a light emitting diode (LED), a laser diode, an incandescent light, and a halogen light.

6. The system of claim 4, wherein the emitter is configured to selectively illuminate a target object in the ambient environment for image recordation by the camera.

7. The system of claim 4, wherein the emitter is configured to selectively illuminate a region in the ambient environment for image recordation by the camera.

8. The system of claim 4, wherein the processing system is further configured to control luminance of the emitter.

9. The system of claim 4, wherein the processing system is further configured to control wavelength of the emitter.

10. The system of claim 1, wherein the processing system is further configured to use the at least one signal to perform image analysis to determine the one of the position, the altitude, and the orientation of the aerial system.

11. The system of claim 1, wherein the processing system is further configured to send the determination of one of the position, the altitude, and the orientation of the aerial system to a remote user device.

12. The aerial system, of claim 1, wherein the emitter is one of a light source, a sound source, an electromagnetic radiation source, and other suitable emitter.

13. An aerial system, comprising:
a body;
a lift mechanism coupled to the body and configured to controllably provide lift and/or thrust;
a processing system configured to control the lift mechanism to provide flight to the aerial system; and
a vision location system coupled to the body, comprising:
a camera configured to obtain one or more images of an environment proximate the aerial system, and
an emitter and a receiver, wherein the emitter is configured to emit visible light, the receiver being configured to sense data related to an ambient environment associated with the aerial system,
the vision location system being further configured to send at least one signal to the processing system, wherein the at least one signal includes the sensed data and the one or more images;
the processing system being further configured to control a controllable parameter of the emitter as a function of the at least one signal, and the processing system being further configured to analyze the at least one signal to determine one of a position, an altitude, and an orientation of the aerial system, wherein the controllable parameter of the emitter is flux.

14. An aerial system, comprising:
a body;
a lift mechanism coupled to the body and configured to controllably provide lift and/or thrust;
a processing system configured to control the lift mechanism to provide flight to the aerial system; and
a vision location system coupled to the body, comprising:
a camera configured to obtain one or more images of an environment proximate the aerial system, and
an emitter and a receiver, the receiver being configured to sense data related to an ambient environment associated with the aerial system,
the vision location system being further configured to send at least one signal to the processing system, wherein the at least one signal includes the sensed data and the one or more images;
the processing system being further configured to control a controllable parameter of the emitter as a function of the at least one signal, and the processing system being further configured to analyze the at least one signal to determine one of a position, an altitude, and an orientation of the aerial system, wherein the at least one signal is a streamed signal.

15. An aerial system comprising:
a body;
a lift mechanism coupled to the body and configured to controllably provide lift and/or thrust;
a processing system configured to control the lift mechanism to provide flight to the aerial system; and
a vision location system coupled to the body, comprising:
a camera configured to obtain one or more images of an environment proximate the aerial system, and
an emitter and a receiver, the receiver being configured to sense data related to an ambient environment associated with the aerial system,
the vision location system being further configured to send at least one signal to the processing system, wherein the at least one signal includes the sensed data and the one or more images;
the processing system being further configured to control a controllable parameter of the emitter as a function of the at least one signal, and
the processing system being further configured to analyze the at least one signal to determine one of a position, an altitude, and an orientation of the aerial system, wherein the processing system is further configured to use the at least one signal to perform image analysis to determine the one of the position, the altitude, and the orientation of the aerial system, wherein the image analysis comprises optical flow analysis.

16. An aerial system, comprising:
a body;
a vision location system coupled to the body, comprising:
a camera configured to obtain one or more images of an environment proximate the aerial system, and an emitter and a receiver, the receiver being configured to sense data related to an ambient environment associated with the aerial system, wherein the vision location system is configured to send at least one signal to the processing system, wherein the at least one signal includes the sensed data and the one or more images; and a processing system configured to control a controllable parameter of the emitter as a function of the at least one signal, wherein the controllable parameter is flux, the processing system is further configured to analyze the at least one signal to determine one of a position, an altitude, and an orientation of the aerial system.

17. The system of claim 16, wherein the camera is downward-facing.

18. The system of claim 16, wherein the emitter is downward-facing.

19. The system of claim 16, wherein the emitter is configured to emit visible light.

20. The system of claim 19, wherein the emitter is one of: a light emitting diode (LED), a laser diode, an incandescent light, and a halogen light.

21. The system of claim 19, wherein the emitter is configured to selectively illuminate a target object in the ambient environment for image recordation by the camera.

22. The system of claim 19, wherein the emitter is configured to selectively illuminate a region in the ambient environment for image recordation by the camera.

23. The system of claim 16, wherein the processing system is further configured to use the at least one signal to perform image analysis to determine the one of the position, the altitude, and the orientation of the aerial system.

24. The system of claim 16, wherein the processing system is further configured to send the determination of one of the position, the altitude, and the orientation of the aerial system to a remote user device.

25. An aerial system, comprising:
a body;
a vision location system coupled to the body, comprising:
   a camera configured to obtain one or more images of an environment proximate the aerial system, and
   an emitter and a receiver, the receiver being configured to sense data related to an ambient environment associated with the aerial system,
   wherein the vision location system is configured to send at least one signal to the processing system, wherein the at least one signal includes the sensed data and the one or more images; and
a processing system configured to analyze the at least one signal to determine one of a position, an altitude, and an orientation of the aerial system, wherein the at least one signal is a streamed signal.

26. An aerial system, comprising:
a body;
a vision location system coupled to the body, comprising:
   a camera configured to obtain one or more images of an environment proximate the aerial system, and
   an emitter and a receiver, the receiver being configured to sense data related to an ambient environment associated with the aerial system,
   wherein the vision location system is configured to send at least one signal to the processing system, wherein the at least one signal includes the sensed data and the one or more images; and
a processing system configured to analyze the at least one signal to determine one of a position, an altitude, and an orientation of the aerial system, wherein the processing system is further configured to use the at least one signal to perform image analysis to determine the one of the position, the altitude, and the orientation of the aerial system, wherein the image analysis comprises optical flow analysis.

* * * * *